US009531778B2

(12) United States Patent
Miller et al.

(10) Patent No.: US 9,531,778 B2
(45) Date of Patent: Dec. 27, 2016

(54) MESSAGE RATE MIXING FOR BANDWIDTH MANAGEMENT

(71) Applicant: Combined Conditional Access Development and Support, LLC (CCAD, LLC), San Diego, CA (US)

(72) Inventors: Kenneth Miller, Poway, CA (US); Lawrence Tang, San Diego, CA (US)

(73) Assignee: Combined Conditional Access Development and Support, LLC, San Diego, CA (US)

( * ) Notice: Subject to any disclaimer, the term of this patent is extended or adjusted under 35 U.S.C. 154(b) by 183 days.

(21) Appl. No.: 14/340,094

(22) Filed: Jul. 24, 2014

(65) Prior Publication Data

US 2016/0028785 A1    Jan. 28, 2016

(51) Int. Cl.
*G06F 15/16* (2006.01)
*H04L 29/06* (2006.01)
*G06F 21/10* (2013.01)

(52) U.S. Cl.
CPC ............... *H04L 65/60* (2013.01); *G06F 21/10* (2013.01); *H04L 65/80* (2013.01); *G06F 2221/0724* (2013.01)

(58) Field of Classification Search
CPC .......................... G06F 21/10; G06F 2221/0724
USPC .................................. 709/202–205, 227–228
See application file for complete search history.

(56) References Cited

U.S. PATENT DOCUMENTS

| | | | | |
|---|---|---|---|---|
| 6,199,450 B1* | 3/2001 | Carlson | .................. | F16H 47/02 |
| | | | | 74/733.1 |
| 6,650,260 B1* | 11/2003 | Geil | ........................ | H03M 9/00 |
| | | | | 341/100 |
| 8,516,529 B2* | 8/2013 | Lajoie | ................. | H04L 65/4076 |
| | | | | 709/203 |
| 8,543,667 B2* | 9/2013 | Hluchyj | .............. | H04L 67/2804 |
| | | | | 709/228 |
| 8,677,020 B2* | 3/2014 | Levkovitz | ............. | H04L 67/306 |
| | | | | 709/203 |
| 8,855,275 B2* | 10/2014 | Cosky | ................. | H04L 65/4038 |
| | | | | 379/114.11 |
| 8,886,824 B2* | 11/2014 | Coulombe | .......... | H04L 12/5835 |
| | | | | 709/202 |
| 2003/0182429 A1* | 9/2003 | Jagels | ............... | H04L 29/06027 |
| | | | | 709/227 |
| 2010/0131270 A1* | 5/2010 | Charzinski | .......... | H04L 65/1079 |
| | | | | 704/234 |
| 2011/0119703 A1* | 5/2011 | Schlack | ............. | H04N 7/17318 |
| | | | | 370/390 |
| 2011/0264530 A1* | 10/2011 | Santangelo | ............ | G06Q 30/02 |
| | | | | 705/14.64 |

* cited by examiner

*Primary Examiner* — Bharat N Barot
(74) *Attorney, Agent, or Firm* — Banner & Witcoff, Ltd.

(57) ABSTRACT

Disclosed are systems and methods for controlling an amount and rate of security related information (e.g., content encryption or rights management information) being transmitted in a content stream to a user device. In one aspect, the disclosure provides a method and related apparatuses for reducing bandwidth usage required when sending transitional security related information during a transition point of different content in a content stream.

20 Claims, 5 Drawing Sheets

MESSAGE RATE MIXING FOR BANDWIDTH MANAGEMENT

BACKGROUND

In conditional access systems, security information such as control words, or information used to derive control words, are inserted into services to allow authorized users to watch or listen to received content on numerous different user devices. Control words may be used to descramble a scrambled content stream (e.g., a channel) at a receiver device such as a gateway, computer, tablet, and/or other computing device. At periodic times, updated or new security information needs to be forwarded to user devices so that they may continue to consume authorized content.

In providing such services, encryption and decryption techniques may be implemented to prevent unauthorized access to services. One encryption and decryption technique for a media stream of a service may include the use of control words and associated ECMs (Encryption Control Messages). Accordingly, in one example, an increase in an amount of content being streamed results in the control words and ECMs being repeated at short intervals during a single cryptographic period, thereby consuming additional bandwidth.

In current conditional access systems, utilized bandwidth is increased just prior to transition points between different content streams as the number of ECM messages is doubled, thereby increasing overall bandwidth usage at potentially unpredictable times. The increasing of the number of total ECM messages just prior to the transition point may begin at approximately five minutes prior to a transition point between content streams. The increase in the total number of ECM messages just prior to a transition point is due to the transmission of "new" ECM messages containing security information for the next content stream to be delivered along with the current ECM messages for the content stream being currently delivered. The new security information is forwarded in advance so that devices may decrypt the new content timely upon content delivery. However, such an increase in ECM bandwidth decreases the overall bandwidth available for consuming services which impacts the user viewing experience for the delivered content stream. A more efficient bandwidth utilization method is needed for systems that exercise control over or provide access to distributed electronic content.

SUMMARY

The following summary is for illustrative purposes only, and is not intended to limit or constrain the detailed description. The following summary merely presents various described aspects in a simplified form as a prelude to the more detailed description provided below.

Features herein relate to efficient use of bandwidth in conditional access systems or other systems which exercise control over or provide access to distributed electronic content. In particular, in one or more embodiment discussed below in greater detail, delivery of control words and associated ECM messages are inserted into content streams at variable rates, delivered, implemented, and/or used in a number of different ways while providing efficient use of overall bandwidth.

For example, some aspects of the disclosure are directed to methods, apparatuses, and computer-readable instructions stored on computer-readable medium for adjusting the insertion rate of security information just prior to a transition point within a content stream. In an embodiment, transition points may represent changes in programing content being streamed. In an aspect of the disclosure, security information about a current content stream may be delivered at rate of X/2 just prior to a transition point during an overlap period. Additional, information about the next content to be delivered may also be delivered at a rate of X/2 just prior to the transition point during an overlap period maintaining the utilized ECM bandwidth constant.

In another aspect of the disclosure, dynamic mixing may occur during an overlap period in which the rate of message insertion rate is varied based on various factors such as service type. During the last crypto period, the system may begin to deliver the information for the next program. In an embodiment, the security information delivered just prior to the transition point in an overlap period may include both security information about the first content stream being delivered and information about security information about the next content items to be delivered at dynamic mixing rates.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Various features described herein relate to controlling an amount and rate of security related information (e.g., content encryption or rights management information) being transmitted in a content stream to a user device. In one aspect, the disclosure provides a method and related apparatuses for reducing bandwidth usage required when sending transitional security related information during a transition point of different content in a content stream. These and other features will be described in greater detail further below.

Figure 1:
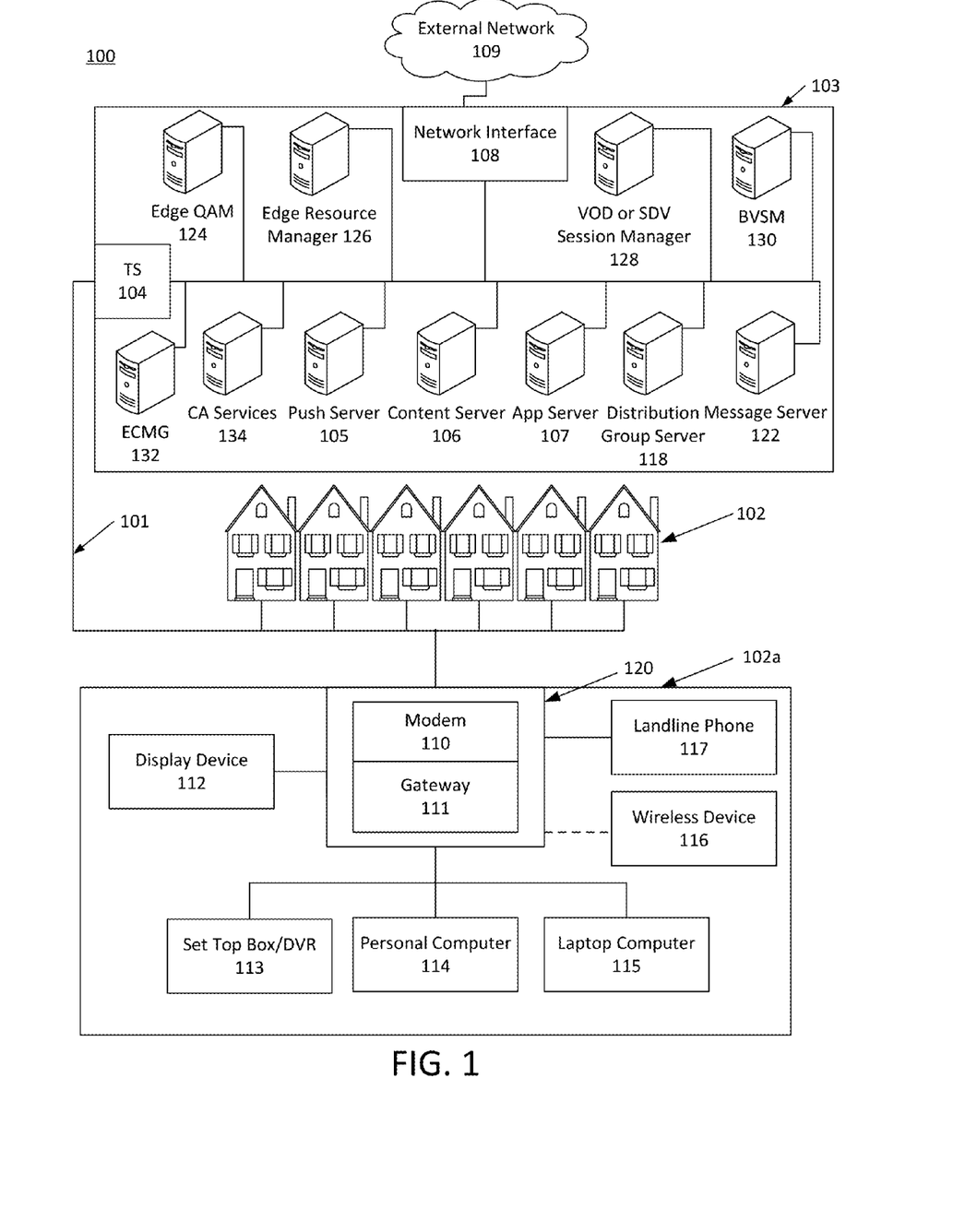
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, user dwellings, etc.) to a local office or headend 103. Local office 103 may transmit downstream information signals onto the links 101, and one or more premises 102 may have a receiver used to receive and process those signals.

There may be one link 101 originating from local office 103, and it may be split a number of times to distribute the signal to various premises 102 in the vicinity (which may be many miles) of local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

Local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

Local office 103 may also include one or more network interfaces 108, which can permit local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, local office 103 may include a variety of servers 105-107 that may be configured to perform various functions. For example, local office 103 may include a push notification server 105. The push notification server 105 may generate push notifications to deliver data and/or commands to the various premises 102 in the network (or more specifically, to the devices in the premises 102 that are configured to detect such notifications). Local office 103 may also include a content server 106. The content server 106 may be one or more computing devices that are configured to provide content to users at their premises. This content, otherwise referred to as content payload or content dataset, may be, for example, video on demand movies, television programs, songs, text listings, etc. Additionally or alternatively, content may be referred to as discrete content items. As such, a content stream may comprise one or more sub-streams of discrete content items. E.g. a content stream may comprise a first sub-stream (first content dataset, which may be, for example, a movie) and a second sub-stream (second content dataset, which may be, for example, a television program). The content server 106 may include software to validate user identities and entitlements, to locate and retrieve requested content, to encrypt the content, and to initiate delivery (e.g., streaming) of the content to the requesting user(s) and/or device(s).

Local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry to allow a device to communicate on one or more links 101 with other devices in the network. For example, the interface 120 may include a modem 110, which may include transmitters and receivers used to communicate on the links 101 and with local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with local office 103 and other devices beyond local office 103. The gateway 111 may be a set-top box (STB), digital video recorder (DVR), a digital transport adapter, computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice Over Internet Protocol—VoIP phones), and any other desired devices. Examples of local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Local office 103 may include a variety of servers 122-134 to manage security related information in use in conditional access systems. In an embodiment, the security related information may include control words and associated ECMs. For example, local office 103 may include an edge quadrature amplitude modulation (EQAM) modulator 124. The EQAM modulator 124 may be one or more computing devices that are configured for use with a converged cable access platform (C-CAP). The EQAM modulator 124 may include an embedded encryptor.

Local office 103 may also include an entitlement control message generator (ECMG) 132. The ECMG 132 may, in response to a request from e.g., the EQAM 124, generate ECMs including the control words for use with a service. The ECMG 132 may send the ECMs to the EQAM 124. The ECMG 132 may also generate the control words. Additionally or alternatively, in some embodiments, a control word generator (CWG), not shown, different from the ECMG 132 may generate the control words. In such embodiments, the CWG may interact and/or may otherwise communicate with the ECMG 132 so that the ECMG 132 may retrieve control words from the CWG for inclusion in the associated ECMs. For example, the ECMG 132 may send a request for control words to the CWG and, in response, may receive control words generated by the CWG.

Local office 103 may include an edge resource manager 126 and a video on demand (VOD) and/or switched digital video (SDV) manager 128. The VOD and/or SDV manager server 128 may interact with user devices at premises 102 to start a program, purchase a program, and/or manipulate a program (e.g., pause, fast-forward, and/or rewind a program). For example, the VOD and/or SDV manager 128 may contact the appropriate VOD server (e.g., a content server 106) and one or more other components of local office 103 so that local office 103 may determine what content is being purchased and by who (e.g., which user and/or user device). The VOD and/or SDV manager 128 may initiate a particular session. Particularly, the VOD and/or SDV manager 128 may send to the edge resource manager 126 a message including an identification of the user device and/or user requesting a specific asset (e.g., the content). The edge resource manager 126 may determine information about the plan of the user device and/or user including, for example, which city and/or house the user device and/or user is located. From such information, the edge resource manager 126 may determine (e.g., pinpoint) which channel the EQAM 124 should transmit to the user device of the user.

Edge resource manager 126 may send to the EQAM 124 (and/or other C-CAP devices) messages including an indication of which channels are being transmitted to these specific downstream premises. For example, the message may indicate that these QAM channels and/or these high speed IP channels are going to these 100 houses including these user devices of the user. The edge resource manager 126 may also send to the EQAM 124 copy control information about the requesting user devices of the user. The copy control information may include the copying capabilities of the requesting user devices of the user to e.g., an external drive. In some embodiments, the copy control information may include copy protection information such as digital rights management information. The EQAM 124 may send the copy control information to the ECMG 132.

Local office 103 may include a broadcast video services manager server (BVSM) 130 and/or a conditional access services server (CA) 134. The BVSM 130 may determine access criteria needed for each service and session. Each content provider may have their own specific access criteria. The BVSM 130 may tag via a universal unique identifier (UUID) each particular access criteria. The BVSM 130 may send the UUID to the CA 134.

CA 134 may be a controller such as, for example, a digital addressable controller (DAC), a digital network control system (DNCS), and/or any other integrated device to manage various conditional access services. The CA 134 may provide hierarchical information to the ECMG 132. In the case of broadcast services, the services are well-defined continuously running sessions. The CA 134 may provide information about those broadcast sessions (also referred to herein as access criteria) to the ECMG. For example, the CA 134 may send the UUID received from the BVSM 130 to the ECMG 132 so that the ECMG 132 may securely transfer the ECMs including the control words to the EQAM 124. The CA 134 may send to the ECMG 132 copy control information for the broadcast services.

Upon request from the EQAM 124, the EQAM 124 receives from the ECMG 132 encryption session information and the ECMs including the control words for the requested content. The EQAM 124 may encrypt the control words based on a session key and insert the associated ECMs into a stream traversing a specified QAM channel to be received by the specified user devices. The user devices may receive the scrambled content including the encrypted ECMs by tuning to and/or otherwise accessing the channel (e.g., the specified QAM channel). The user devices at the premises 102 may also use the session key information to properly derive the control words received in the ECMs (e.g., to decrypt the encrypted control words). The user devices may receive the session key in entitlement management messages (EMMs). Once the user devices decrypt the control words in the ECM, the user device may descramble the content on the channel based on the control word during an appropriate crypto period.

While the servers 122-134 are shown as part of local office 103, in some embodiments, one or more of the servers 122-134 may be part of a third party independent of local office 103. In such embodiments, the servers 122-134 may communicate with one another and/or local office 103 via the external network 109.

Communication network 100 of FIG. 1 may include a server (i.e., distribution group server 118) or system of servers (i.e., distribution group server 118 and message server 122) that supports a distribution group. The distribution group server 118 and/or message server 122 may maintain, organize, and store the membership and/or rights data and store such information in a variety of data storage forms including but not limited to data in a database, memory, files, lists, and tables.

Figure 2:
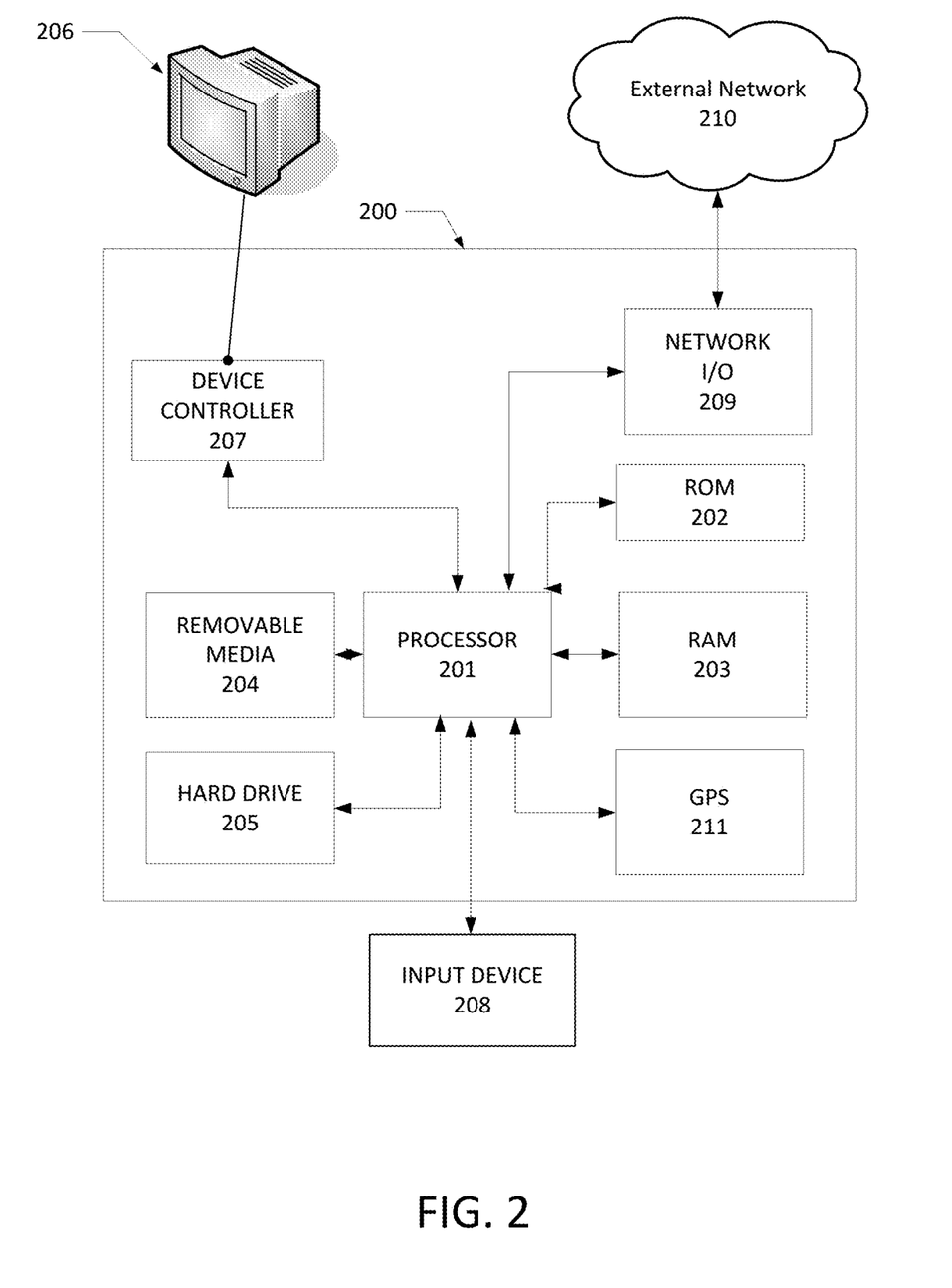
FIG. 2 illustrates an exemplary computing device that can be used in accordance with various features described herein.

FIG. 2 illustrates general hardware elements that can be used to implement any of the various computing devices discussed herein. Computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. Computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc.

Computing device 200 may also include one or more network interfaces, such as a network input/output (I/O) circuit 209 (e.g., a network card) to communicate with an external network 210. Network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

In an embodiment, modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
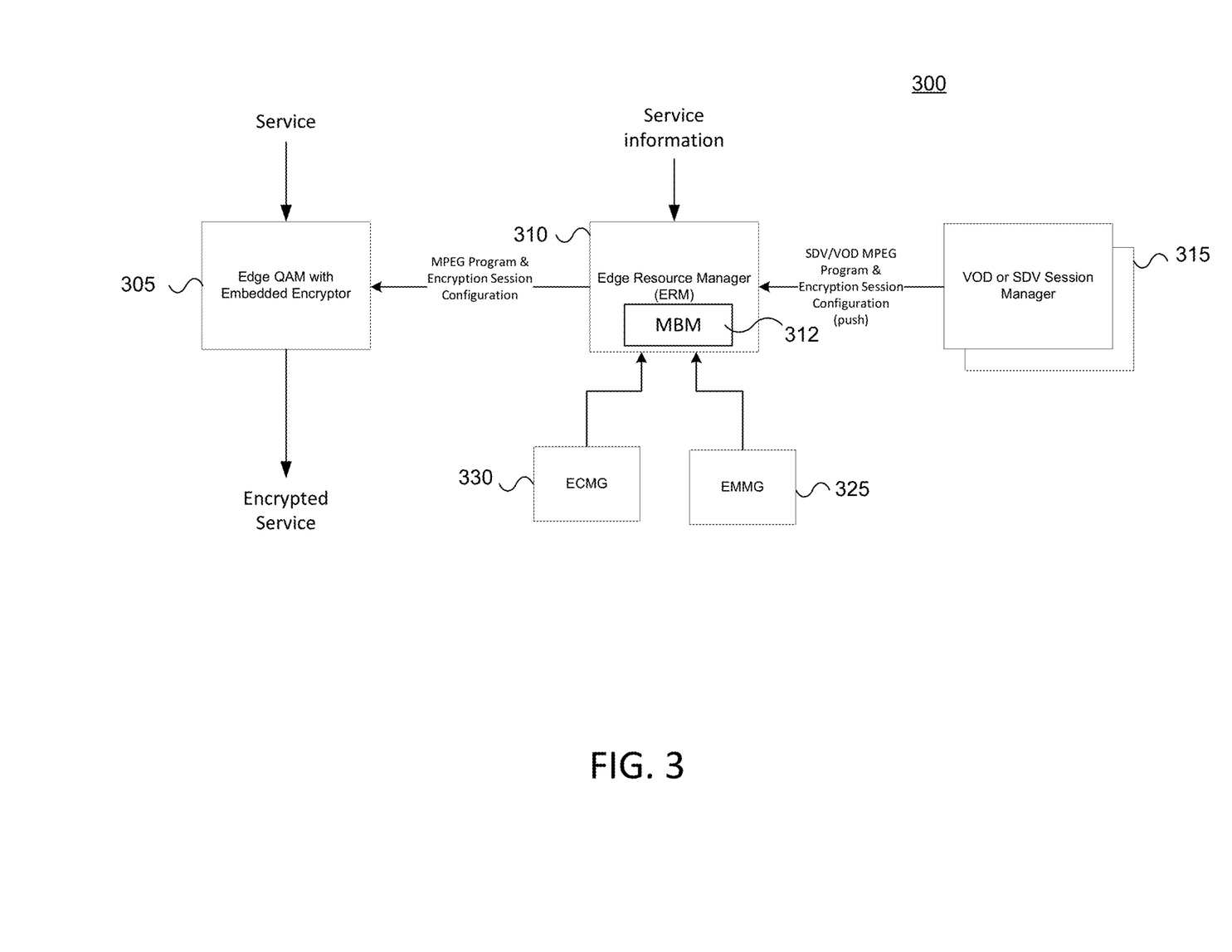
FIG. 3 illustrates an exemplary system block diagram that may be used to implement various features described herein.

FIG. 3 illustrates an exemplary system block diagram that may be used to implement various features described herein. Some of the components of local office and/or headend 103 described above with reference to FIG. 1 have been omitted for the sake of simplicity. The architecture of system 300 depicted in FIG. 3 is similar in many respects to the architecture of network 100 described above with reference to FIG. 1 and may include additional features not mentioned above.

In this case, FIG. 3 illustrates part of a converged cable access platform (CCAP) encryption infrastructure and associated data flows therein. The system 300 may be a local office and/or headend including one or more servers 305-330. For example, the system 300 may include an edge quadrature amplitude modulation with embedded encryptor for use with a converged cable access platform (CCAP) (also referred to herein as EQAM) 305, an edge resource manager (ERM) 310, a video-on-demand (VOD) and/or switched digital video (SDV) session manager 315, an entitlement control message generator (ECMG) 330, and an entitlement management message generator (EMMG) 325. A message bandwidth manager (MBM) 312 may also be included as a separate server or other device or in another alternative, as shown in FIG. 3, embedded as part of edge resource manager (ERM) 310.

In an aspect of the disclosure, a user device may request a service (e.g., a video service) on a channel (e.g., a QAM channel). Each QAM channel may be dedicated to a specific service. Additionally or alternatively, one or more QAM channels may be dedicated to multiple services. The user device may send the request for service to one or more components of system 300. For example, the user device may send the request to the VOD and/or SDV session manager 315. The request for service may indicate the particular program requested and subscription information of the user device and/or the user. In some embodiments, the request for service may be sent in response to a channel change at a set-top box, a DTA, and/or another computing device.

In an embodiment based on the received user device request, access criteria may be determined for the requested service. The access criteria may be transmitted to the ECMG 330. The access criteria may include hierarchical key information. For example, the ECMG 330 may receive multiple layers of session keys needed to properly create control words. These session keys are also needed by the user devices of the user so that the user devices may properly derive control words received in ECMs by decrypting the encrypted control words based on the session keys.

In the case of broadcast services, the services are well-defined continuously running sessions and services may be assigned to predefined channel maps that are only occasionally changed (e.g., when a new channel is introduced). Access criteria regarding these broadcast services may be forwarded from a CA conditional access services server (CA) 134 (FIG. 1).

In an embodiment, the access criteria may also include copy control information for the broadcast services. Copy control information may include the content copying capabilities of the requesting user devices. The copy control information may also include digital rights management information to prevent copying of content sent to the requesting user devices. The digital right management information may be based on the content copying capabilities of the requesting content devices.

Once the content being purchased and the requesting user are determined, a VOD and/or SDV session manager 315 may initiate a particular session. Particularly, the session manager 315 may send to the ERM 310 a message indicating that this particular user device is requesting this specific asset (e.g., the content associated with the video service). The ERM 310 may determine information about the plan of the user device and/or user including, for example, which city and/or house the user device and/or user is located. From such information, the ERM 310 may determine which QAM channels are to be used to transmit what video content and to which user devices. For example, the ERM 310 may determine (e.g., pinpoint) which QAM channel it needs to send. The ERM 310 may send to the EQAM 305 a message identifying which QAM channels are to be sent to which groups of users (e.g., these 100 houses). The group of users may include the user associated with the requesting user device. In response, the EQAM 305 may allocate a QAM channel to the requested service.

The VOD and/or SDV session manager 315 may push to the ERM 310 an SDV and/or VOD MPEG program as well as an encryption session configuration. For example, the VOD MPEG program may be a movie ordered by the user from the user device.

The ERM 310 may send to the EQAM 305 (and/or other CCAP devices) messages including an indication of which QAM channels are going to which specific downstream premises (e.g., these QAM channel are going to these 100 houses including these user devices of the user). The ERM 310 may also send to the EQAM 305 copy control information about the requesting user devices of the user. The copy control information may include the copying capabilities of the requesting user devices of the user and/or digital rights management information.

In some embodiments, the EQAM 305 may push VOD rights metadata to the ECMG 330. For example, the EQAM 305 may send the copy control information to the ECMG 330. For example, the EQAM 305 encryptor may send the video services access criteria UUID to the ECMG 330 so that the ECMG 330 may produce appropriate messages (e.g., ECMs) for the EQAM 305 encryptor.

In some embodiments, the EQAM 305 may pull the encryption session, ECMs and control words (CWs) responses from the ECMG 330. For example, the EQAM 305 may include a synchronizer that may interact with the ECMG 330 to retrieve ECMs. The EQAM 305 may send a request for a particular number of control words sufficient to stream a video service for a predetermined period of time (e.g., six crypto periods). The ECMG 330 may, in response to receiving such a request, generate the control words and ECMs sufficient to stream the service for the predetermined period of time. The ECMG 330 may then transmit the ECMs including the control words to the EQAM 305. The EQAM 305 may include an embedded encryptor (e.g., a scrambler) to encrypt and/or scramble control words.

In some embodiments, there may be a one-to-one link between the EQAM 305 and the ECMG 330 because each service may be individually configured and controlled. The EQAM 305 may request a specific service and request for CWs and ECMs for multiple crypto periods for use with that specific service. The ECMG 330 may decide the optimum number of ECMs including respective control words on a per stream or service basis.

Figure 4:
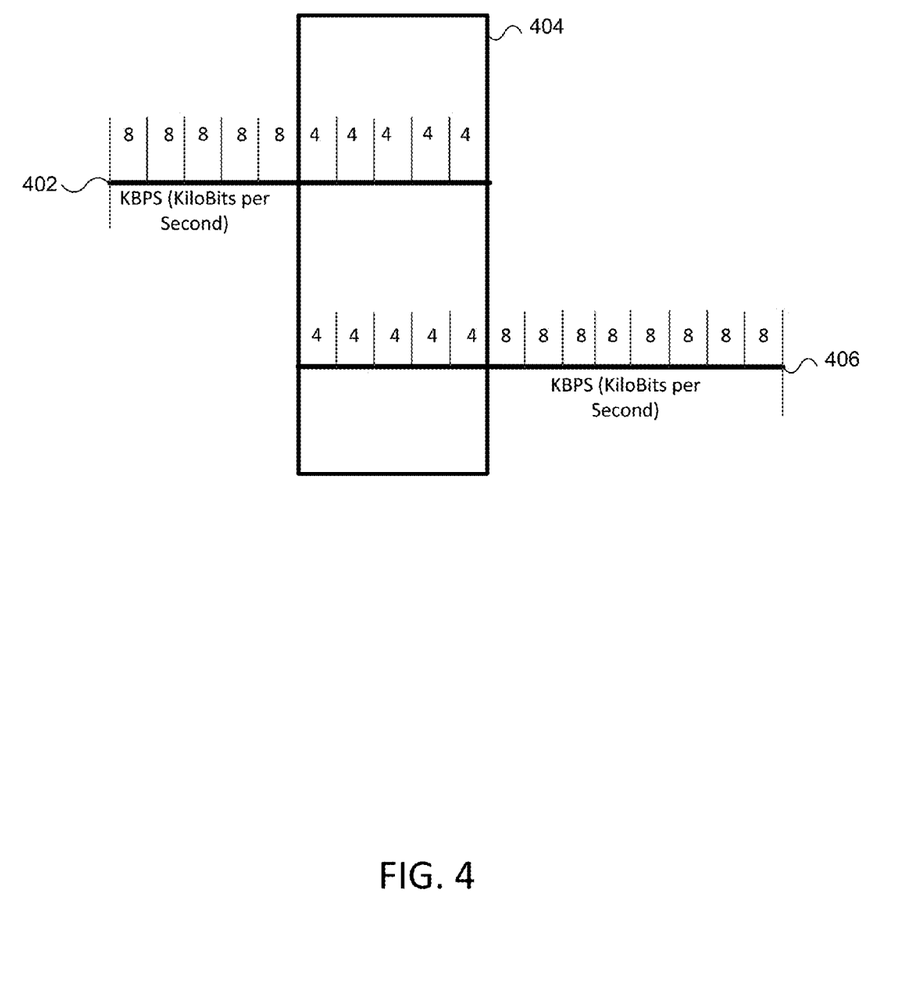
FIG. 4 illustrates an exemplary set of ECMs and associated message insertion rates in accordance with various aspects of the disclosure.

In an aspect of the disclosure, in response to receiving a request, the ECMG 330 may generate a first set of control words and a first set of associated ECMs based on the requested number of control words. Each ECM may include at least one control word. A series of exemplary ECMs 402 is shown in FIG. 4. The ECMs 402 may include control words which in this exemplary embodiment are delivered at a rate of 4 Kbits per second. The ECMs 402 and associated control words are transmitted along with the content stream so that authorized receiving devices may properly decrypt content received in the content stream.

In an embodiment, the control words may be generated in accordance with a data encryption standard (DES), a triple data encryption standard (triple DES), an advanced encryption standard (AES), and/or another encryption standard. For example, the DES algorithm may be used by the ECMG to create e.g., a 56-bit key, a 64-bit key, or some other size encryption key. For example, the triple DES algorithm may be used by the ECMG to create 112 bit key, a 128 bit key, or some other size encryption key.

In an aspect of the disclosure, a message bandwidth manager MBM 312 may determine a number of control words sufficient to stream a requested service for a predetermined period of time. For instance, MBM 312 may determine for a four hour movie using a cryptographic period of 10 seconds, 1440 control words are needed to be transmitted using 1440 ECMs. In an embodiment, the cryptographic periods may range between 0.1 seconds and 15 seconds in length. In some embodiments, the crypto period may be set by a user and/or may change dynamically based on one or more factors including, such as, for example, the sensitivity of the content and the like.

In an aspect of the disclosure, MBM 312 may adjust the number and insertion rate of ECMs to be delivered in the content stream based on overall available bandwidth. The MBM 312 may also adjust the rate of ECMs to be delivered in the content stream based on other factors such as service type, length of service, length of crypto period, overlap period, and priority of service. In addition, the MBM 312 may also consider additional factors such as receipt of manual overrides. The adjustment of the rate of ECMs insertion into the content stream may be at fixed steps or adjusted dynamically based on various factors. Some factors which may be used to dynamically adjust insertion rates of ECMs may include service type, message size, overlap location, content priority, etc.

In an aspect of the disclosure, MBM 312 may adjust the insertion rate of ECMs just prior to a transition point between programs received on a particular service. The transition point may be located at a point in time in which ECMs for current content being watched are needed along with a second set of ECMs to decrypt the next subsequent service to be included in the content stream. The inclusion of the second set of ECMs just prior to receipt of the next subsequent content stream allows a user device to timely decrypt the new content to be transmitted without disrupting the viewer experience.

Figure 5:
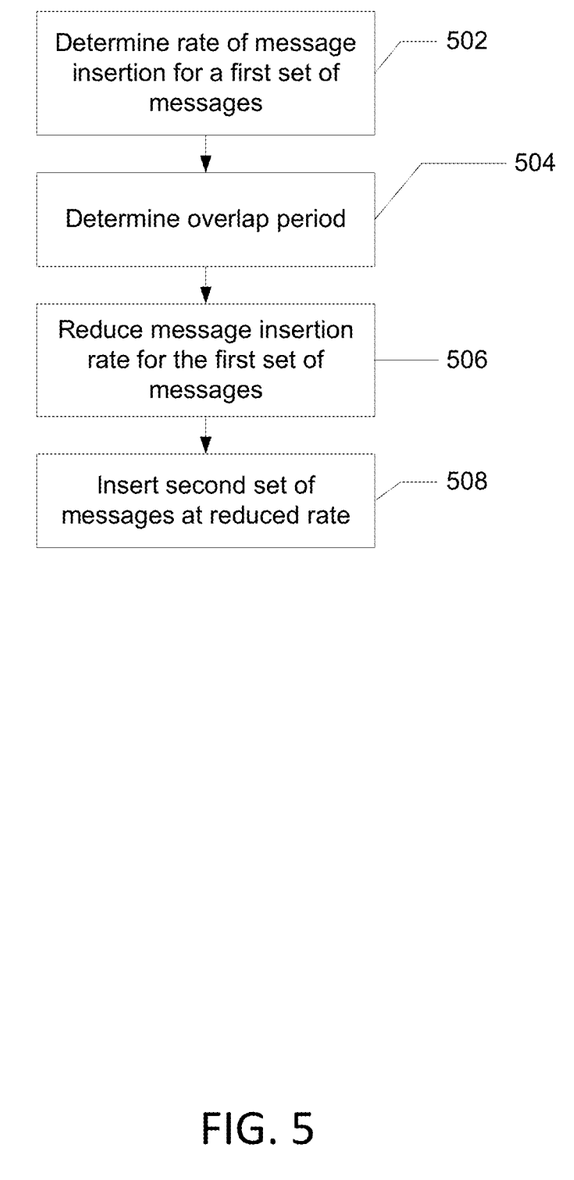
FIG. 5 illustrates a flow diagram in accordance with one or more illustrative aspects discussed herein.

FIG. 5 illustrates a flow diagram in accordance with one or more aspects of the disclosure. In FIG. 5, at step 502 a rate of message insertion for a first set of messages may be determined. The first set of messages may be associated with first content to be delivered in a content stream. The first set of messages may comprise a set of ECMs having control words for decryption of authorized content. The ECMs may be streamed in the content stream in a portion of the content stream reserved for security related messages.

In step 504, an overlap period may be determined. The overlap period may be a time period starting at a time period before an end of delivery of a first content stream and the start of delivery of second content in the content stream.

FIG. 4 illustrates overlap period 404 between a first set of ECMs 402 and a second set of ECMs 406. The overlap period 404 of FIG. 4 occurs starting at a time period before an end of delivery of a first content stream and the start of delivery of second content in the content stream. In an embodiment, the overlap period may define a time period between delivery of the first set of messages in the content stream and a second set of messages to be subsequently delivered in the content stream. In yet another embodiment, the overlap period may comprise durations of one second or more. In other embodiments, the overlap period may comprise durations of less than one second.

In one example, one or more ECMs 402 may be transmitted at a steady-state rate of message insertion. Accordingly, in one implementation, a steady-state rate of message transmission may be associated with a data transfer rate of 8 Kbits per second. However, those of ordinary skill in the art will understand that any data rate may be utilized with a steady-state rate of transfer. Further, the use of the term steady-state merely serves to indicate one example of a data transfer rate associated with one or more ECMs 402 during a time period outside of overlap period 404. Accordingly, the term steady-state, as used herein, should not be limited to time-invariant data transfer rates, and the like.

In one example, and during overlap period 404, a data transfer rate associated with ECMs 402 (wherein ECMs 402 may be associated with first content) may be reduced from that steady-state rate of 8 Kbits, and a second data transfer rate associated with ECMs 406 may be lower than the steady-state rate. In one implementation, a first reduced data rate associated with ECMs 402 may be 4 Kbits per second and a second reduced data rate associated with ECMs 406 may be 4 Kbits per second. Those of ordinary skill in the art will understand that the first reduced data rate and the second reduced data rate may have any data rate values, and may be different values from one another. In another implementation, the summation of the first reduced data rate and the second reduced data rate is less than or substantially equal to the steady-state rate. Accordingly, as used herein, the term substantially may be +/−5%, +/−10%, +/−15%, or +/−20% among others.

In step 506, the rate of message insertion for a first set of messages is reduced as compared to the determined rate of message insertion for the first set of messages during the determined overlap period.

In step 508, a second set of messages is inserted into the overlap period of the content stream. The second set of messages may be associated with second content subsequently delivered in the content stream. In an embodiment, the second set of messages inserted into the content stream occurs at a reduced rate as compared to the determined rate of message insertion for the first set of messages.

In addition to the control words, during program transitions it may be necessary to also receive higher level security features such as higher level keys to decrypt the ECMs or associated control words. For instance, entitlement management message generator (EMMG) 325 may at some frequency deliver rights associated with user accounts or user devices. In some embodiments, there is a link between the ECMs and EMMs, the messages are cryptographically linked so both messages streams may be needed to descramble a particular service. In an embodiment, EMMs may be transmitted or forwarded on a monthly basis whereas, the ECMs are included and spaced throughout the content stream.

In an aspect of the disclosure, ECMs may be inserted for future programs to be streamed in the last second of the current content being streamed (just prior to new content being streamed). This dynamic mixing of ECMs from the content currently being streamed and "new" ECMs for subsequent content to be streamed may maintain the same overall ECM bandwidth so that ECM bandwidth does not take away bandwidth from the content being delivered. In an aspect of the disclosure, some EMM bandwidth may also be used to deliver ECMs.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in the art. Such alterations, modifications, and improvements as made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   determining a rate of message insertion for a first set of messages, the first set of messages associated with first content to be delivered in a content stream;
   reducing, during an overlap period, the rate of message insertion to a first reduced rate for the first set of messages as compared to the determined rate of message insertion for the first set of messages, the overlap period occurring between delivery of the first set of messages in the content stream and a second set of messages to be subsequently delivered in the content stream;
   inserting, during the overlap period, the second set of messages, the second set of messages associated with second content subsequently delivered in the content stream, the inserting of the second set of messages occurring at a second reduced rate as compared to the determined rate of message insertion for the first set of messages; and
   simultaneously transmitting, during the overlap period, the first set of messages at the first reduced rate and the second set of messages at the second reduced rate.

2. The method of claim 1, wherein the reducing of the rate of message insertion to the first reduced rate for the first set of messages occurs at half the rate as compared to the determined rate of message insertion for the first set of messages.

3. The method of claim 1, wherein the reducing of the rate of message insertion to the first reduced rate for the first set of messages occurs at one third the rate as compared to the determined rate of message insertion for the first set of messages.

4. The method of claim 1, wherein the inserting of the second set of messages further comprises inserting control words associated with a plurality of cryptographic periods.

5. The method of claim 1, wherein the reducing of the rate of message insertion to the first reduced rate for the first set of messages further comprises dynamically reducing the rate based on a service type for the first content and the second content.

6. The method of claim 1, wherein the reducing of the rate of message insertion to the first reduced rate for the first set of messages further comprises dynamically reducing the rate based on bandwidth requirements for the first content and the second content.

7. A method comprising:
 determining a rate of message insertion for a first set of messages, the first set of messages associated with first content to be delivered in a content stream;
 determining an overlap period between delivery of the first set of messages in the content stream and a second set of messages to be subsequently delivered in the content stream;
 reducing, during the overlap period, the rate of message insertion for the first set of messages to a first reduced rate as compared to the determined rate of message insertion for the first set of messages;
 inserting, during the overlap period, the second set of messages, the second set of messages associated with second content subsequently delivered in the content stream, the inserting of the second set of messages occurring at a second reduced rate as compared to the determined rate of message insertion for the first set of messages; and
 simultaneously transmitting, during the overlap period, the first set of messages at the first reduced rate and the second set of messages at the second reduced rate.

8. The method of claim 7, wherein the reducing of the rate of message insertion to the first reduced rate for the first set of messages occurs at half the rate as compared to the determined rate of message insertion for the first set of messages.

9. The method of claim 7, wherein the reducing of the rate of message insertion to the first reduced rate for the first set of messages occurs at one third the rate as compared to the determined rate of message for the first set of messages.

10. The method of claim 7, wherein the inserting of the second set of messages further comprises inserting control words associated with a plurality of cryptographic periods.

11. The method of claim 7, wherein the reducing of the rate of message insertion to the first reduced rate for the first set of messages further comprises dynamically reducing the rate based on a service type for the first content and the second content.

12. The method of claim 7, wherein the reducing of the rate of message insertion to the first reduced rate for the first set of messages further comprises dynamically reducing the rate based on bandwidth requirements for the first content and the second content.

13. A method comprising:
 reducing, during an overlap period, a rate of insertion for a first set of messages to be delivered in a content stream to a first reduced rate and reducing a rate of insertion for a second set of messages to be subsequently delivered in the content stream to a second reduced rate, the overlap period starting from a start of delivery of the second set of messages and ending at an end of delivery of the first set of messages;
 inserting, during the overlap period, the second set of messages; and
 simultaneously transmitting, during the overlap period, the first set of messages at the first reduced rate and the second set of messages at the second reduced rate.

14. The method of claim 13, wherein the reducing of the rate of insertion for the first set of messages and reducing the rate of insertion for the second set of messages further comprises determining a service type for first content associated with the first set of messages and second content associated with the second set of messages.

15. The method of claim 13, wherein the overlap period comprises a last crypto period for first content associated with the first set of messages.

16. The method of claim 15, wherein the last crypto period comprises a duration of one second.

17. The method of claim 13, wherein the reducing of the rate of insertion for the first set of messages and reducing the rate of insertion for the second set of messages further comprises determining a message size for the first set of messages and the second set of messages.

18. The method of claim 13, wherein the reducing of the rate of insertion for the first set of messages and reducing the rate of insertion for the second set of messages further comprises determining priority of first content associated with the first set of messages and second content associated with the second set of messages.

19. The method of claim 13, wherein the reducing of the rate of insertion for the first set of messages and reducing the rate of insertion for the second set of messages further comprises receiving a manual control to adjust the rate of insertion during the overlap period.

20. The method of claim 13, wherein the reducing of the rate of insertion for the first set of messages and reducing the rate of insertion for the second set of messages further comprises determining a location of the overlap period within the content stream.

* * * * *